(12) United States Patent
Shimotani

(10) Patent No.: US 10,331,433 B2
(45) Date of Patent: Jun. 25, 2019

(54) HYBRID OPERATING SYSTEM FOR AN IN-VEHICLE APPARATUS

(71) Applicant: DENSO CORPORATION, Kariya, Aichi-pref. (JP)

(72) Inventor: Takashi Shimotani, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/504,042

(22) PCT Filed: Jul. 28, 2015

(86) PCT No.: PCT/JP2015/003765
§ 371 (c)(1),
(2) Date: Feb. 15, 2017

(87) PCT Pub. No.: WO2016/035244
PCT Pub. Date: Mar. 10, 2016

(65) Prior Publication Data
US 2017/0255461 A1 Sep. 7, 2017

(30) Foreign Application Priority Data

Sep. 1, 2014 (JP) .................................. 2014-177087

(51) Int. Cl.
*G06F 8/65* (2018.01)
*G06F 11/14* (2006.01)
*G06F 9/445* (2018.01)
*G06F 9/4401* (2018.01)

(52) U.S. Cl.
CPC .............. *G06F 8/65* (2013.01); *G06F 9/4418* (2013.01); *G06F 9/44505* (2013.01); *G06F 11/1433* (2013.01)

(58) Field of Classification Search
CPC ....... G06F 8/65; G06F 9/4418; G06F 9/44505; G06F 11/1433
USPC .................................................. 717/168–178
See application file for complete search history.

(56) References Cited

U.S. PATENT DOCUMENTS

2003/0036843 A1   2/2003   Okude et al.
2005/0268296 A1*  12/2005  Marolia .................. G06F 8/65
                                                  717/168
2008/0184243 A1*  7/2008   Otsuki .................... G06F 9/547
                                                  718/102

(Continued)

FOREIGN PATENT DOCUMENTS

JP    2003036174 A    2/2003
JP    2006119727 A    5/2006

(Continued)

*Primary Examiner* — Qing Chen
(74) *Attorney, Agent, or Firm* — Harness, Dickey & Pierce, P.L.C.

(57) ABSTRACT

An in-vehicle apparatus with a hybrid OS structure including a first OS for executing a native application pre-installed in the in-vehicle apparatus and a second OS for executing a distribution application acquired from an external apparatus is provided. The in-vehicle apparatus includes a storage device that stores the multiple OSs and the applications; an update unit that updates each software in the storage device; and a stop unit that makes a function of the second OS temporarily stop during an update operation of the update unit.

6 Claims, 3 Drawing Sheets

(56) References Cited

U.S. PATENT DOCUMENTS

| | | | | |
|---|---|---|---|---|
| 2009/0112394 A1* | 4/2009 | Lepejian | .............. | G07C 5/0808 |
| | | | | 701/29.5 |
| 2012/0227040 A1* | 9/2012 | Gounares | ............ | G06F 9/45558 |
| | | | | 718/1 |
| 2012/0331266 A1* | 12/2012 | Anraku | ................ | G06F 11/073 |
| | | | | 711/207 |
| 2013/0345977 A1 | 12/2013 | Shimizu et al. | | |
| 2014/0052330 A1* | 2/2014 | Mitchell | .................... | G06F 8/65 |
| | | | | 701/31.5 |
| 2016/0014167 A1* | 1/2016 | Darabiha | ............... | G06Q 30/02 |
| | | | | 715/751 |

FOREIGN PATENT DOCUMENTS

| | | | | | |
|---|---|---|---|---|---|
| JP | | 2014006437 A | | 1/2014 | |
| WO | WO 2012092706 A1 * | | 7/2012 | ............. | G06F 9/455 |

\* cited by examiner

HYBRID OPERATING SYSTEM FOR AN IN-VEHICLE APPARATUS

CROSS REFERENCE TO RELATED APPLICATIONS

This application is a U.S. National Phase Application under 35 U.S.C. 371 of International Application No. PCT/JP2015/003765 filed on Jul. 28, 2015 and published in Japanese as WO 2016/035244 A1 on Mar. 10, 2016. This application is based on and claims the benefit of priority from Japanese Patent Application No. 2014-177087 filed on Sep. 1, 2014. The entire disclosures of all of the above applications are incorporated herein by reference.

TECHNICAL FIELD

The present disclosure relates to an in-vehicle apparatus provided with a hybrid OS structure including a first OS for executing a native application pre-installed in the apparatus and a second OS for executing a distribution application acquired from an external apparatuses.

BACKGROUND ART

In recent years, a computer is provided with a hybrid OS structure in which two OSs run on a single CPU. In in-vehicle terminal apparatuses also, there is a proposed apparatus (for example, refer to Patent Literature 1) that operates multiple OSs on a single CPU to control peripheral devices (in-vehicle system).

For example, an in-vehicle apparatus (in-vehicle system) equipped with a navigation function, an audio function, a telephone function and the like is provided with a hybrid OS structure in which two OSs, for example, Linux (registered trademark) and Android (registered trademark), are operable. In this in-vehicle system, multiple applications including various distribution applications acquired from an external apparatus in addition to a native application such as a pre-installed navigation application and the like are executable simultaneously (in cooperation with each other).

PRIOR ART LITERATURES

Patent Literature

Patent Literature 1: JP 2003-36174A

SUMMARY OF INVENTION

According to studies by the inventor of the present application, a system having this kind of hybrid OS structure involves a concern each application operates in its own way and a distribution application distributed from an external and operating on Android may exert various unpredicted influences on a function of the native application installed in the in-vehicle apparatus. In software updating in particular, there is a concern that writing speed and processing performance for software updating may be negatively influenced by the operation of the distribution application and stability may be remarkably lowered.

It is an object of the present disclosure to provide an in-vehicle apparatus which has a hybrid OS structure for execution of a native application and a distribution application and which can prevent an occurrence of unpredicted troubles resulting from execution of the distribution application during a software update process.

In an example of the present disclosure, an in-vehicle apparatus includes: a hybrid OS structure including a first OS for executing a native application pre-installed in the in-vehicle apparatus and a second OS for executing a distribution application acquired from an external apparatus; a storage device that stores the plurality of OSs and the applications; an update unit that updates each software in the storage device; and a stop unit that makes a function of the second OS temporarily stop during an update operation of the update unit.

In the above in-vehicle apparatus, because of the hybrid OS structure, the pre-installed native application is executable by the first OS and additionally the distribution application acquired from an external is executable by second OS. The update unit performs software update of multiple OSs and applications stored in the storage device.

In some cases, an unpredictable distribution application may be acquired (developed) and there is a concern that this kind of distribution application may exert an unintended influence on a function of the native application. At a time of software update in particular, the negative influence may be exerted on the wiring speed and the processing performance. In this regard however, the stop unit temporarily stops the second OS during the software update operation of the update unit. Therefore, unpredicted troubles resulting from execution of the distribution application during the software update operation are prevented.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
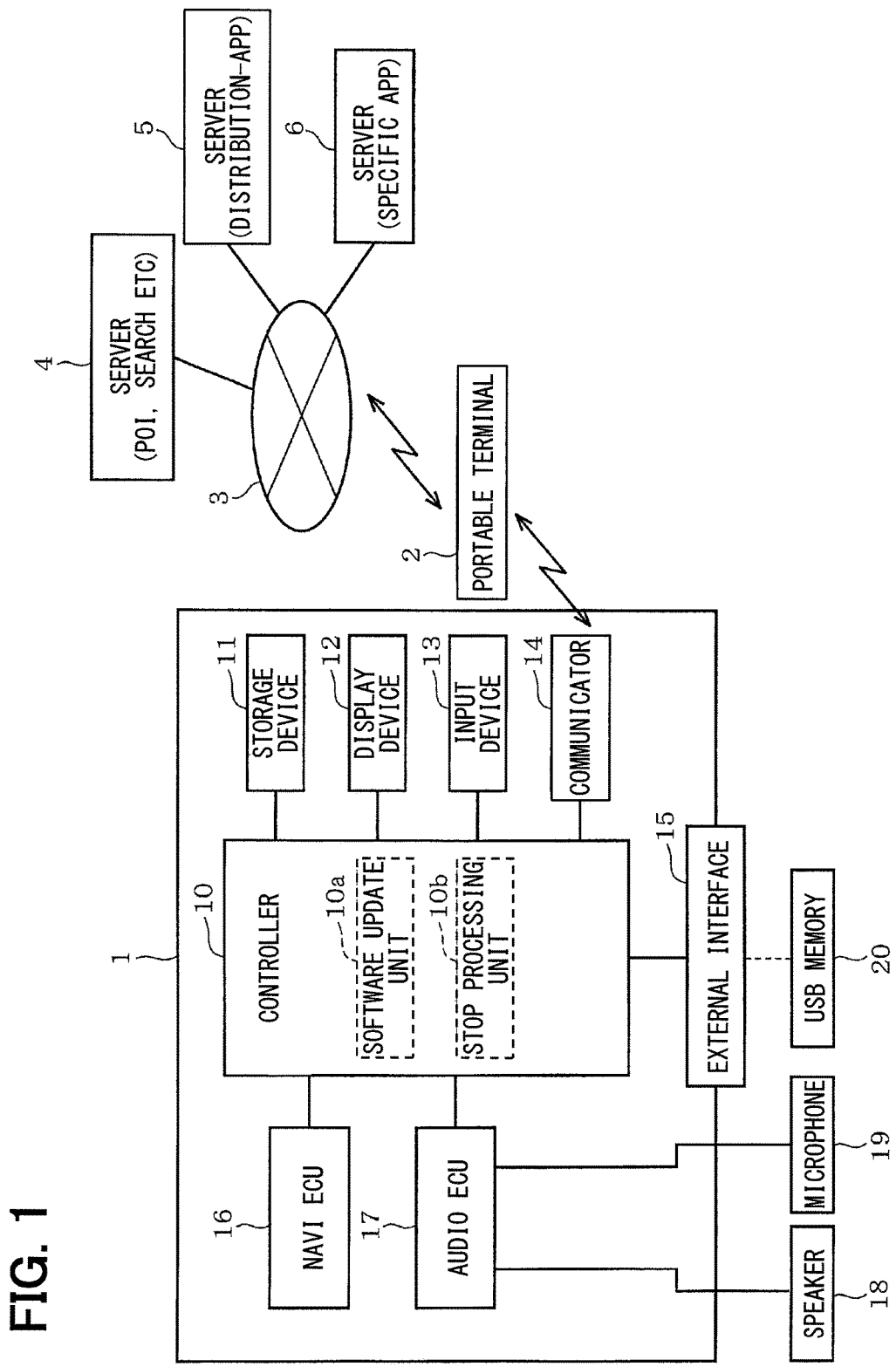
FIG. 1 is diagram schematically illustrating an electric configuration of an in-vehicle system of an embodiment.

One embodiment will be described below with reference to the drawings. FIG. 1 schematically illustrates an electric configuration of an in-vehicle device (apparatus itself) 1 and a system configuration including the in-vehicle device 1 of the present embodiment. The in-vehicle apparatus 1 of the present embodiment is capable of connecting a Bluetooth (registered trademark) wireless communication with a portable terminal 2 such as a smartphone or the like carried by a user (driver of an automobile) and is capable of cooperative operation with it.

The portable terminal 2 is communicably connected to multiple servers 4, 5, 6 (three servers are shown in the drawings for illustrative purpose) via, for example, Internet 3. Among them, the server 4 provides the smartphone 2 (in-vehicle apparatus 1) with, for example, POI (Point of interest) related information and search service. The server 5 distributes distribution applications (abbreviated as distribution-app hereinafter) to the smartphone 2 (in-vehicle apparatus 1). The server 6 provides the smartphone 2

(in-vehicle apparatus 1) with, for example, a service that corresponds to a specific application (included in the distribution-apps). A server configuration shown in FIG. 1 is an example and this does not limit the number, types of service provided, and the like.

The in-vehicle apparatus 1 includes a controller 10, a storage device 11, a display device 12, an input device 13, a communicator 14, and an external interface 15. The external interface 15 includes a USB connector (USB port) 15a (see FIG. 3). This USB connector 15a is arranged at, for example, an arm rest portion in a vehicle cabin.

The in-vehicle apparatus 1 further includes a navigation ECU (Electronic Control Unit) 16 for providing a navigation function and an audio ECU17 for providing an audio function. The audio ECU17 is connected with a speaker 18 and a microphone 19. The in-vehicle apparatus 1 functions as what is called a navigation system. The in-vehicle apparatus 1 implements the navigation function and the audio function by the controller 10, or alternatively may not have the navigation function or the audio function.

Not shown in the drawings in details, the controller 10 includes, as its main component, a computer with a CPU, a ROM, a RAM and the like. The controller 10 has a function to control display of the display device 12. Mainly due to its software configuration, the controller 10 includes a software update unit 10a which updates each software of the storage device 11 and which acts as a update unit and an update means, a stop processing unit 10b which temporarily stops a function of a second OS (later-described Android (registered trademark)) during a software update operation of the software update unit 10a. These will be specifically described later.

In the present embodiment, the controller 10 (in-vehicle apparatus 1) provides an operation environment in which multiple applications (abbreviated as apps hereinafter) are executable by a hybrid OS structure. Namely, the structure enables two OS to run on a single CPU in parallel (in cooperation with each other). Specifically, the operation environment of a first OS (registered trademark) and a second OS (registered trademark) is provided. The first OS is a Linux (registered trademark) and is capable of executing (controlling) native applications pre-installed. The second OS is an Android (registered trademark) and is capable of executing (controlling) distribution applications downloaded from, for example, the external server 5 or the like via the communicator 14.

Figure 2:
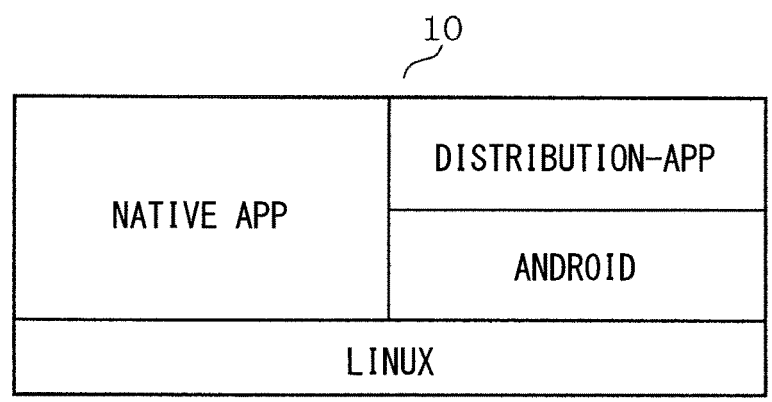
FIG. 2 is a diagram schematically illustrating a software structure of a controller.

FIG. 2 schematically illustrates a software structure of the controller 10. Hardware is managed by the Linux OS (kernel) acting as the first OS. The native applications are arranged above this Linux OS. The Android OS acting as the second OS is arranged above the Linux OS. The distribution applications distributed from an external (servers 4, 5, 6) are arranged above the Android OS.

The native applications include, for example, an application for displaying on the display device 12, an application for accepting a manipulation on the input device 13, an application for communicating with the navigation ECU 16 and the audio ECU 17, an application for speech output of the speaker 18, and an application for speech recognition of, for example, speech inputted to the microphone 19. The native applications include, for example, applications for monitoring a fuel remaining amount, managing an ETC in-vehicle device, and performing various monitoring and warning relating to vehicle traveling.

These software groups are stored in the storage device 11 which includes an electrically-rewritable semiconductor storage element such as flash memory and the like. In the present embodiment, an SD memory card is employed as the storage device 11. In the present embodiment, the SD memory card is in a built-in state in the in-vehicle apparatus 1. That is, the SD memory card is not detachable from the in-vehicle apparatus 1. The storage device 11 may be storage devices having different sizes such as a miniSD card and a microSD card. The storage device 11 may be storage devices having different transfer speeds and maximum capacities, such as a SHDC memory card. The storage device 11 may be something like an SSD (Solid State Disk) and may be memory cards supporting other standards. The storage device 11 may not be standardized devices such as memory cards and may have such a configuration that a NAND flash memory is directly connected for example.

Figure 4:
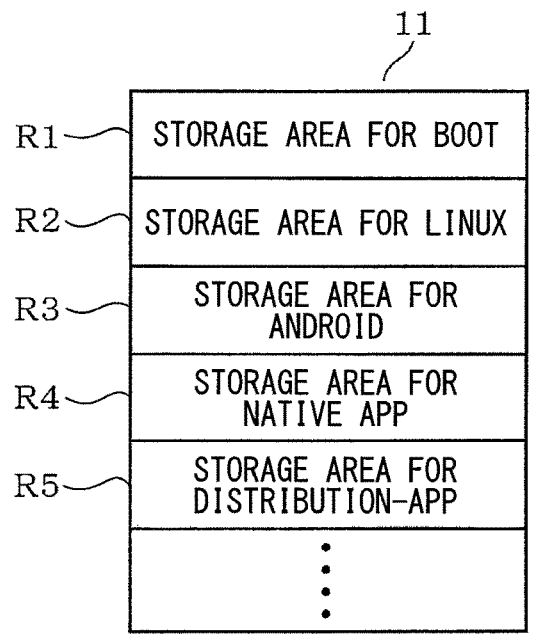
FIG. 4 is a diagram schematically illustrating how to assign storage areas of a storage device.

The storage device 11 has storage areas (partitions) as shown in FIG. 4. The storage areas include a storage area R1 for boot which stores programs and the like for managing start-up of the in-vehicle apparatus 1, a storage area R2 for Linux which stores the Linux OS, a storage area R3 for Android which stores the Android OS, a storage area R4 for native applications which stores the native applications, and a storage area R5 for distribution applications which stores the distribution applications. Specifically, the software groups for operating the in-vehicle apparatus 1 are collectively stored in the single storage device 11.

The controller 10 is configured such that under normal circumstances, the controller 10 performs processes relating to the navigation with the navigation ECU 16, for example, a display process of map display with the display device 12. In this case, the hybrid OS structure enables multiple applications, which include the native application and the distribution application, to simultaneously run in parallel. Additionally, as described above, the software update unit 10a of the controller 10 functions as the update unit and the update means to perform a process of updating each software of the storage device 11.

Figure 3:
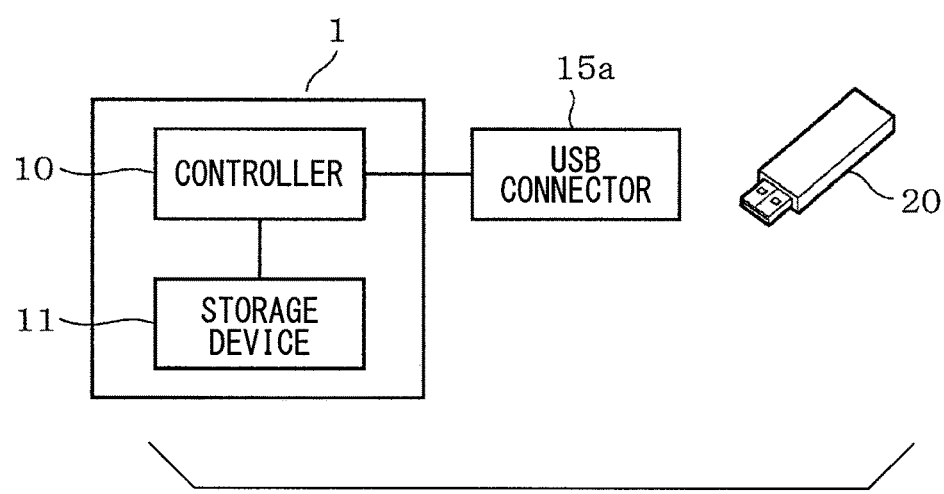
FIG. 3 is a diagram schematically illustrating a hardware structure of the controller.

In the present embodiment, as shown in FIG. 3, the software for update is stored in the USB memory 20 which is a storage medium. This USB memory 20 is connected to the in-vehicle apparatus 1 via the USB connector 15a, so that the update process is performed. In the present embodiment basically, the Linux OS (storage area R2 for Linux), the Android OS (storage area R3 for Android), the native applications (storage area R4 for native applications) out of the software stored in the storage device 11 (storage areas) are to be updated collectively.

In the present embodiment, during the software update process by the software update unit 10a, a function of Android is temporarily stopped by the stop processing unit 10b, which operation will be described later (in the description of flowchart). Accordingly, during the software update process, execution of all of the distribution applications is stopped. It is noted that the stop processing unit 10b may perform the stop process not only when the Linux OS, the Android OS and the native applications are collectively updated but also when any of them is updated. At a time of updating the Android OS only, the distribution applications (storage area R5 for distribution application) may be also updated together.

Figure 5:
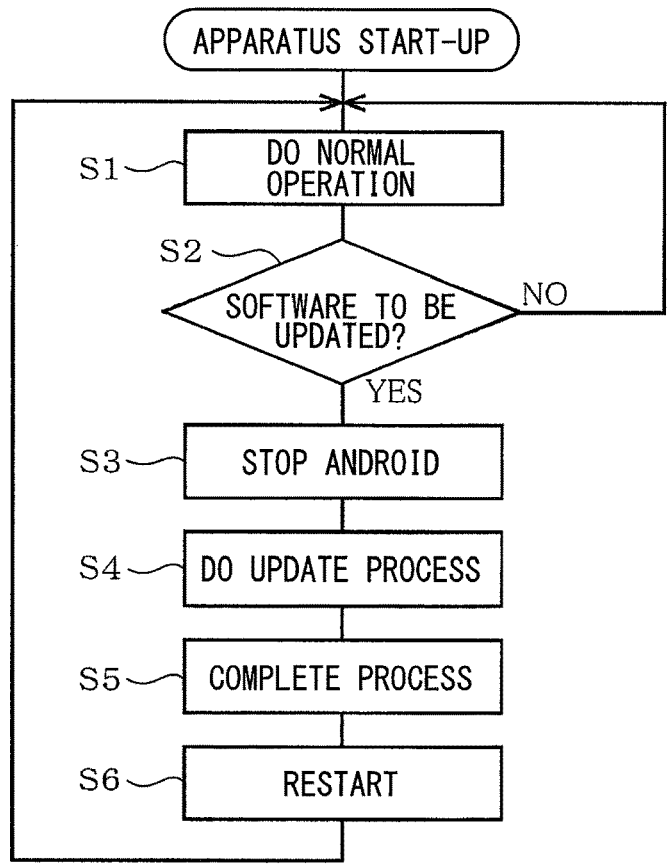
FIG. 5 is a diagram illustrating a processing procedure of software update performed by the controller.

Next, the operation of the above-described configuration will be described with reference to FIG. 5. The flowchart in FIG. 5 illustrates a processing procedure of the software update performed by the controller 10. Specifically, for example, when the ignition switch is turned on and the in-vehicle apparatus 1 starts up, a normal operation is performed at step S1. Now, when the user would like the software update process to be performed, the USB memory 20 storing the software for update is connected to the USB connector 15a.

At step S2, it is determined whether or not the software should be updated. This determination is made based on whether or not the USB memory 20 storing the software for update is connected to the USB connector 15a. When the USB memory 20 for software update is not recognized (No at Step S2), the processing returns to S1 to perform the normal operation. When the USB memory 20 for software update is recognized (YES at Step S2), the stop process of temporarily stopping the function of Android is performed at Step S3. In this case, a screen of the software update process is displayed on the display device 12.

At step S4, the software update process is performed. In this software update process, a process of copying the software from the USB memory 20 to the storage device 11 and installing it is performed. During this process, because the function of Android is stopped, the distribution applications are not executed. When the software update process is completed at step S5, the apparatus is re-started at step S6. After the re-start, the processing returns to the normal operation, so that all the software (applications) becomes executable.

In a system having the hybrid OS structure, a distribution application which cannot be predicted in advance may be acquired (developed) as a distribution application which is distributed from the external to operate on Android. There is a concern that this kind of distribution application may exert various unpredictable influences on the function of the native application pre-installed in the in-vehicle apparatus 1. In software update in particular, there is a concern that the writing speed or processing performance for the software update may be negatively influenced by the operation of the distribution application and that a time taken for the update may become inordinately long or the stability may be remarkably lowered.

In the present embodiment however, during the software update operation by the software update unit 10a, the function of Android is stopped temporarily by the stop processing unit 10b. Therefore, the present embodiment, which has the hybrid OS structure in which the native application for Linux and the distribution application for Android are executable, advantageously prevents occurrence of unpredictable troubles resulting from the execution of the distribution application during the software update process.

In the present embodiment in particular, because the software update unit 10a is configured to perform the update process based on connecting the USB memory 20 storing the update software to the USB connector 15a, the update process can be executed by a simple manipulation. In this connection, in recent years, an in-vehicle system including the USB connector 15a at an arm rest or the like of the vehicle is becoming popular, and thus, the use of the USB memory 20 as the storage medium leads to low cost without complicating a configuration.

In the present embodiment, the update of the software in the storage device 11 performed by the software update unit 10a during the temporary stop of the function of Android by the stop processing unit 10b includes not only the collective update of the Linux OS, the Android OS and the native application (as needed) but also the update of only the Linux OS, the update of only the native application (as needed) and the update of only the Android OS, that is, the update of each individual software. Therefore, in updating each individual software also, it becomes possible to prevent occurrence of unpredictable troubles resulting from the execution of the distribution application during the software update process.

In the above embodiment, the USB memory 20 is employed as a storage medium. However, for example, other medium such as an optical disk, a magnetic disk and the like may be employed. The technology in the present disclosure is applicable to updating software through communications via Internet or the like, without via the storage medium. In the above illustrations, Linux is employed as a first OS and Android is employed as a second OS. However, this is not limiting and various OSs may be employed.

In the above illustrations, the navigation system acts as the in-vehicle apparatus 1. However, the in-vehicle apparatus is not limited to the navigation system and is applicable to various ECUs (Electronic Control unit) mounted in a vehicle, such as those for an audio apparatus, a telephone apparatus and the like. Additionally, a hardware configuration of the in-vehicle apparatus, a software configuration of the controller and the like may be modified in various ways. Embodiments are not limited to the above-illustrated embodiments and can be modified and extended without departing from the spirit and scope of the present disclosure.

What is claimed is:

1. A system for a hybrid operating system for an in-vehicle apparatus comprising:
    a hybrid operating system (OS) software structure including a first OS executing a native application pre-installed in the in-vehicle apparatus and a second OS executing a distribution application acquired from an external apparatus, wherein the first OS and the second OS are executed in parallel;
    a storage device having a memory that stores the first OS, the second OS, the native application, and the distribution application;
    a software update unit that updates at least one of the first OS, the second OS, the native application, and the distribution application in the storage device; and
    a stop processing unit that makes a function of temporarily stopping execution of only the second OS during an update operation performed by the software update unit so that execution of the distribution application is prevented from affecting execution of the native application during the update operation by the software update unit.

2. The system for a hybrid operating system for an in-vehicle apparatus according to claim 1, wherein:
    updating at least one of the first OS, the second OS, the native application, and the distribution application by the software update unit includes:
    updating only the first OS, updating only the native application, and updating only the second OS.

3. The system for a hybrid operating system for an in-vehicle apparatus according to claim 1, wherein:
    upon connecting a non-transitory storage medium storing update software to the in-vehicle apparatus, the software update unit performs the update operation.

4. The system for a hybrid operating system for an in-vehicle apparatus according to claim 1, wherein:
    the second OS is Android (registered trademark).

5. The system for a hybrid operating system for an in-vehicle apparatus according to claim 1, wherein:
    the native application pre-installed in the in-vehicle apparatus includes applications for performing various monitoring and warning relating to vehicle traveling.

6. An in-vehicle apparatus comprising:
    a storage device having a memory that stores a first operating system (OS), a second OS, a native application pre-installed in the in-vehicle apparatus, and a distribution application acquired from an external apparatus; and a controller having a processor configured to:
  execute the first OS and the second OS in parallel, wherein the first OS executes the native application, and wherein the second OS executes the distribution application;
  perform an update operation to update at least one of the first OS, the second OS, the native application, and the distribution application; and
  temporarily stop execution of only the second OS during the update operation so that execution of the distribution application is prevented from affecting execution of the native application during the update operation.

* * * * *